(12) United States Patent
O'Hara et al.

(10) Patent No.: US 7,979,209 B2
(45) Date of Patent: Jul. 12, 2011

(54) TEMPORAL MAPPING AND ANALYSIS

(75) Inventors: Charles G. O'Hara, Columbus, MS (US); Bijay Shrestha, Starkville, MS (US); Veeraraghavan Vijayaraj, Knoxville, TN (US); Preeti Mali, Starkville, MS (US)

(73) Assignee: Mississippi State University Research and Technology Corporation, Mississippi State, MS (US)

( * ) Notice: Subject to any disclaimer, the term of this patent is extended or adjusted under 35 U.S.C. 154(b) by 218 days.

(21) Appl. No.: 11/279,978

(22) Filed: Apr. 17, 2006

(65) Prior Publication Data

US 2006/0276968 A1 Dec. 7, 2006

Related U.S. Application Data

(60) Provisional application No. 60/671,507, filed on Apr. 15, 2005.

(51) Int. Cl.
*G06F 19/00* (2006.01)
(52) U.S. Cl. .......................................................... 702/1
(58) Field of Classification Search .................. 702/1–14
See application file for complete search history.

(56) References Cited

U.S. PATENT DOCUMENTS

| | | | |
|---|---|---|---|
| 5,321,612 A * | 6/1994 | Stewart | 702/13 |
| 5,870,691 A * | 2/1999 | Partyka et al. | 702/16 |
| 6,078,701 A * | 6/2000 | Hsu et al. | 382/294 |
| 6,373,482 B1 | 4/2002 | Migdel et al. | |
| 6,831,688 B2 * | 12/2004 | Lareau et al. | 348/272 |
| 6,912,491 B1 * | 6/2005 | Van Bemmel | 703/2 |

OTHER PUBLICATIONS

Peter Baumann, Unified Retrieval on High-Volume Sensor, Image, and Statistics Databases, CODATA Prague Workshop, Information Visualization, Presentation, and Design, Mar. 29-31, 2004, p. 1-7.*
Gary A. Shaw and Hsiao-hua K. Burke, Spectral Imaging for Remote Sensing, vol. 14, No. 1, 2003, Lincoln Laboratory Journal, p. 4-28.*
Jeremy Mennis, Roland Viger, and U.S. Geological Survey, Analyzing Time Series of Satellite Imagery Using Temporal Map Algebra, ASPRS Annual Conference Proceedings May 2004, Denver, Colorado, p. 1-8.*
Asanobu Kitamoto, Spatio-Temporal Data Mining for Typhoon Image Collection, Journal of Intelligent Information Systems, 19:1, 25-41, 2002, p. 25-41.*
Harvey J. Miller and Shih-Lung Shaw, Geographic Information Systems for Transportation (GIS-T): Principles and Applications, Aug. 2001, p. 1-15.*
U.S. Appl. No. 11/279,978, filed Apr. 17, 2006, Pending.
U.S. Appl. No. 11/279,982, filed Apr. 17, 2006, Pending.
U.S. Appl. No. 11/279,831, filed Apr. 14, 2006, Pending.
U.S. Appl. No. 11/279,820, filed Apr. 14, 2006, Pending.
U.S. Appl. No. 11/279,841, filed Apr. 14, 2006, Pending.

* cited by examiner

*Primary Examiner* — Tung S Lau
(74) *Attorney, Agent, or Firm* — Lawrence Arthur Schemmel

(57) ABSTRACT

A compositing process for selecting spatial data collected over a period of time, creating temporal data cubes from the spatial data, and processing and/or analyzing the data using temporal mapping algebra functions. In some embodiments, the temporal data cube is creating a masked cube using the data cubes, and computing a composite from the masked cube by using temporal mapping algebra.

23 Claims, 13 Drawing Sheets

TEMPORAL MAPPING AND ANALYSIS

CROSS-REFERENCE TO RELATED APPLICATIONS

The present application claims priority to U.S. provisional application Ser. No. 60/671,507 filed on Apr. 15, 2005, the entire contents of which are incorporated herein by reference.

STATEMENT AS TO RIGHTS TO INVENTIONS MADE UNDER FEDERALLY SPONSORED RESEARCH AND DEVELOPMENT

This invention was made with Government support under No. NCC13-99001 awarded by the National Aeronautics and Space Administration (NASA). The government may have certain rights in the invention.

FIELD OF THE INVENTION

The present invention relates generally to data treatment methods and systems and more particularly to temporal mapping and analysis of temporal data.

BRIEF SUMMARY

A method of mapping and analyzing co-registered raster data collected over a period of time comprises forming a temporal data cube from the co-registered raster data and analyzing the temporal data cube using temporal map algebra functions. Temporal map algebra functions comprise conventional map algebra functions extended to the temporal dimension.

Another aspect is to provide a compositing process comprising optionally preprocessing raster data collected over a period of time, creating data cubes from the preprocessed raster data, creating a masked cube using the data cubes, and computing a composite from the masked cube. The resultant composite cube may then be analyzed.

DESCRIPTION OF EMBODIMENTS OF THE INVENTION

Conventional methods for analyzing temporal images typically operate on a per pixel basis, discount a significant part of the data, and down sample the data to create a product.

Temporal mapping and analysis (TMA) allows one to improve remote sensing data inputs to enhance analysis of temporal data streams. TMA uses temporal map algebra to improve data processing, taking into consideration not only the pixel value but also the effect of neighboring pixel values. TMA provides a set of tools for manipulating and analyzing time series of temporally rich raster data using temporal map algebra. The temporal map algebra functions treat the time series of raster data as three-dimensional data sets where two dimensions encode planimetric position on the earth's surface and the third dimension encodes time. The raster data may be raw sensor data (e.g., image data, temperature data, etc.), processed sensor data, or a calculated value (e.g., NDVI) based on the raw image data.

Temporal image cubes are created using co-registered temporal raster data sets as ordered stacks of bands within a multi-band image. Thus, a time series of raster data, which can include image data such as satellite imagery, may be manipulated according to various processing techniques. Using temporal map algebra, multiple criteria may be imposed on attributes cubes to create mask cubes, and a user can select from temporal image cubes only specific pixels that meet user-defined criteria. After reducing the image data to only desired pixels, local, focal, zonal and/or global functions may be employed to create custom composites for specific temporal intervals.

Figure 1:
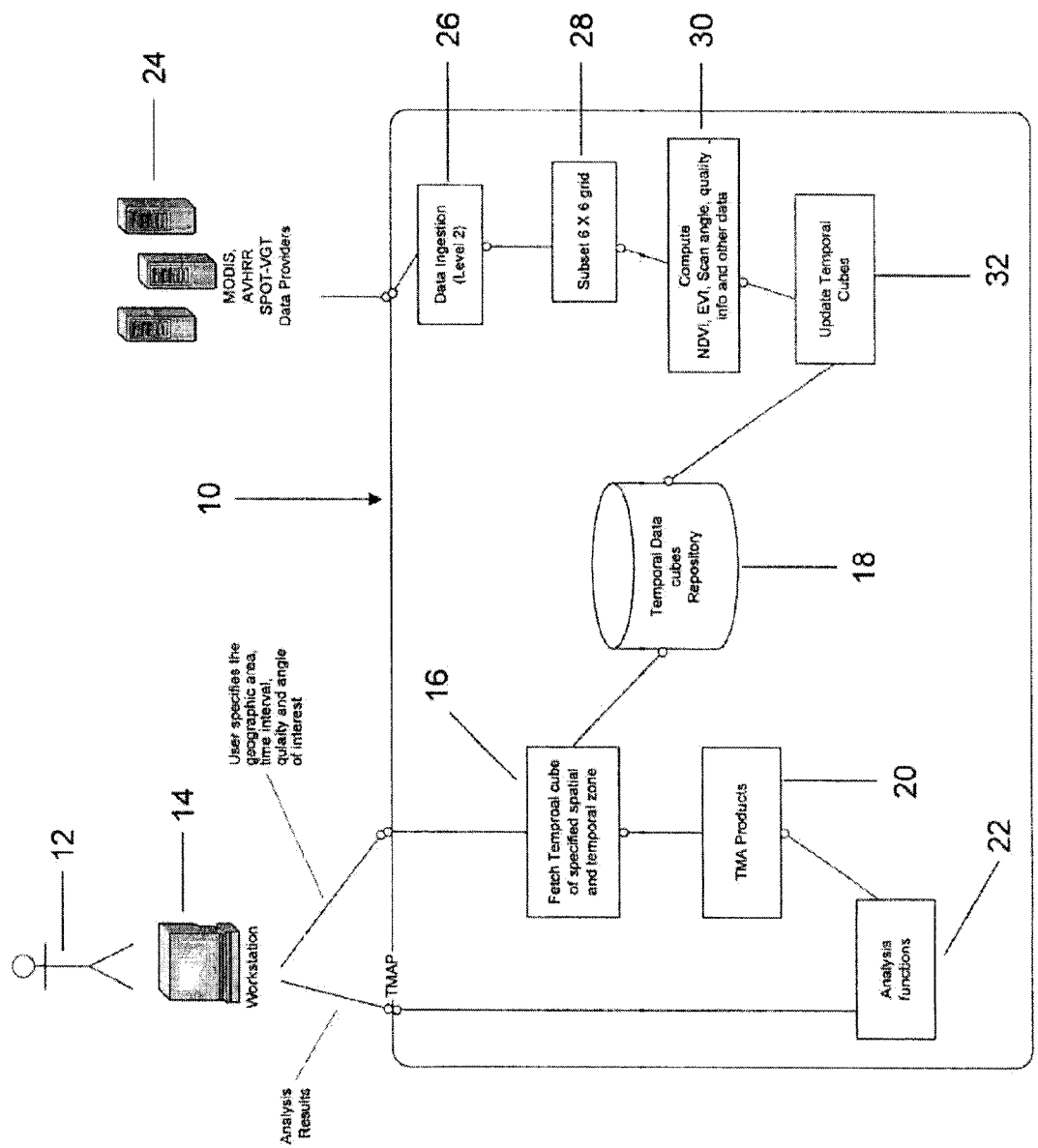
FIG. 1 is a schematic high level diagram depicting a relationship between various components or functions in a temporal mapping and analysis environment or system, according to an embodiment of the invention.

FIG. 1 is a schematic high level diagram depicting a relationship between various components or functions in a temporal mapping and analysis environment or system 10, according to one embodiment of the invention. A user 12 associated with workstation 14 specifies a geographic area, time interval, and angle of interest by interacting with a graphical user interface (GUI) of a temporal mapping and analysis system 10 via workstation 14. The temporal mapping and analysis tool 10 then fetches (or creates) a temporal cube of specified spatial and temporal zone 16 from a temporal data cubes repository 18. A user is able to perform temporal mapping algebra on the fetched temporal cube by using temporal mapping and analysis products 20 and performing analysis functions 22 on the temporal cube. For example, a user may refine the selection of images to be included in a desired composite product for an area, and may indicate a desired method and select tunable parameters for analyzing the temporal data. Results of the analysis are displayed on the workstation 14 via the graphical user interface to allow the user to visualize the results of the analysis. The user may also be able to evaluate results by employing zonal analysis windows in which typical zonal functions, spatial analyses, and statistical analyses may be computed.

In an embodiment of the invention, the temporal data cubes in the repository 18 may be collected from the moderate resolution imaging spectro-radiometer (MODIS) data provider, the advanced very high resolution radiometer (AVHRR) data provider, or the satellite spot vegetation sensor (SPOT-VGT) data provider, or from any combination of providers, as depicted at 24. MODIS is an instrument aboard the Terra (EOS AM) and Aqua (EOS PM) satellites. AVHRR is a radiation-detection imager that can be used for remotely determining cloud cover and surface temperature (surface of the earth, surface of clouds and/or surface of a body of water).

The collected data, which may include atmospheric, geographic or geometric data, or the like is ingested by data ingestion 26. A subset of the data is then created at 28. For example, a subset 6° by 6° grid can be created. However, it must be appreciated that the use of other subsets are within the scope of the present invention. For example a subset 10° by 10° grid may be used instead of the subset 6° by 6° grid. Normalized difference vegetation index (NDVI), enhanced vegetation index (EVI), scan angle, quality information and other data may then be computed, at 30. The temporal cubes are then updated, at 32, and/or the data saved as a new temporal data cube, in the temporal data cubes repository 18.

TABLE 1 lists some of components and/or functions that are used in the temporal mapping and analysis tool 10. TABLE 1 lists the functions data preprocessing (e.g., MODIS, AVHRR data ingestion, etc.), user interaction (for example, via the GUI), product creation and analysis (for example, using temporal map algebra functions, etc.). It should be understood that the list of functions in TABLE 1 is exemplary only and that many other functions, especially temporal map algebra functions, may be defined.

TABLE 1

| Function | Aspects |
|---|---|
| Data preprocessing | Ingest the selected MODIS, AVHRR and SPOT-VEG data products to produce daily data sets. |
| | Produce daily data sets containing NDVI, EVI, quality, angle information etc. |
| | Update and/or create temporal cubes using the daily data sets. |
| User interaction | Provide GUI to interact with user to acquire spatial, temporal, quality and angle related information. |
| | Provide user opportunity to validate the information |
| Product creation | Produce products from user supplied model information and the temporal cubes. |
| | Temporal map algebra functions for products |
| | Local functions |
| | Min |
| | Max |
| | Total |
| | Mean |
| | Variance |
| | LocalGridAddition |
| | LocalGridSubstraction |
| | Focal functions |
| | Min |
| | Max |
| | Total |
| | Mean |
| | Variance |
| | Standard deviation |
| | Zonal functions |
| | Min |
| | Max |

TABLE 1-continued

| Function | Aspects |
|---|---|
| | Total |
| | Mean |
| | Variance |
| | Standard Deviation |
| | Global functions |
| | Min |
| | Max |
| | Total |
| | Mean |
| | Variance |
| | Standard Deviation |

TABLE 2 lists some data characteristics at various phases in the execution of various functions in the temporal mapping and analysis tool 10. For example, at the data ingestion phase, the data is ingested from MODIS, AVHRR, SPOT-VEG data, or any combination thereof. At the daily data set creation phase, tiles surface reflectance values may be calculated, scaling and offsetting parameters may be implemented, quality grid and/or angle grid may be computed, etc. At the temporal cube phase, temporal data cubes of various types of data (e.g., NDVI, EVI) can be created.

TABLE 2

| Phase | Data characteristics |
|---|---|
| Data Ingestion | MODIS, AVHRR, SPOT-VEG data |
| Daily Data set creation | 6° × 6° tiles surface reflectance values |
| | Scaling and offsetting parameters implemented |
| | Quality grid |
| | Angles grid |
| Temporal cube | NDVI cube |
| | EVI cube |
| | 6° × 6° tiles |
| | Quality cubes |
| | Angles cube |
| | Temperature cube etc., |
| Products | NDVI composite |
| | EVI composite |
| | Custom modeled products |
| | 6° × 6° tiles |

Normalized difference vegetation index (NDVI) data sets generated from satellite imagery can play an important role in the study of global vegetation and dynamics. Temporal map algebra is a method that can be used to compute global cloud-free NDVI data sets. The computation of global NDVI is a monumental task, involving colossal storage and significant computational resources.

For example, to show the enormity of the storage and computation requirements, the following example is provided. A single 6° by 6° tiled surface of a cloud-free NDVI data composite generated using TMA from MODIS data-sets is approximately 26 MB in size. It takes approximately 13 minutes to compute the data in a single 1 Ghz Pentium III processor. Hence, using this data, the size of a global data-set and the computing time can be calculated. For example, a global data-set that contains around 1000 such tiles (i.e., 6°×6° tiles) per day is 26 GB of size per day and would take around 9 days to compute them.

Parallel processing can be used to increase speedup of processing. Speedup S can be defined as the serial runtime ($T_s$) divided by the parallel runtime ($T_p$), i.e., $S=T_s/T_p$. Parallel processing is performed by decomposing a large process into small processes that can be treated simultaneously and hence provide faster execution time. Thus, parallelization provides a way to solve a large computationally intensive process like temporal image compositing, which would otherwise take a relatively long time on a sequential computing machine.

Temporal map algebra (TMA) functions are temporal extensions to conventional map algebra. The temporal map algebra functions treat a time series of imagery as three-dimensional data in which two dimensions encode the plane on Earth's surface or some other predefined plane and the third dimension encodes time. This allows the time series of satellite imagery to be manipulated according to various processing techniques. The logical data model for temporal map algebra is a regular tessellation of $R^3$, a three dimensional matrix.

Figure 12:
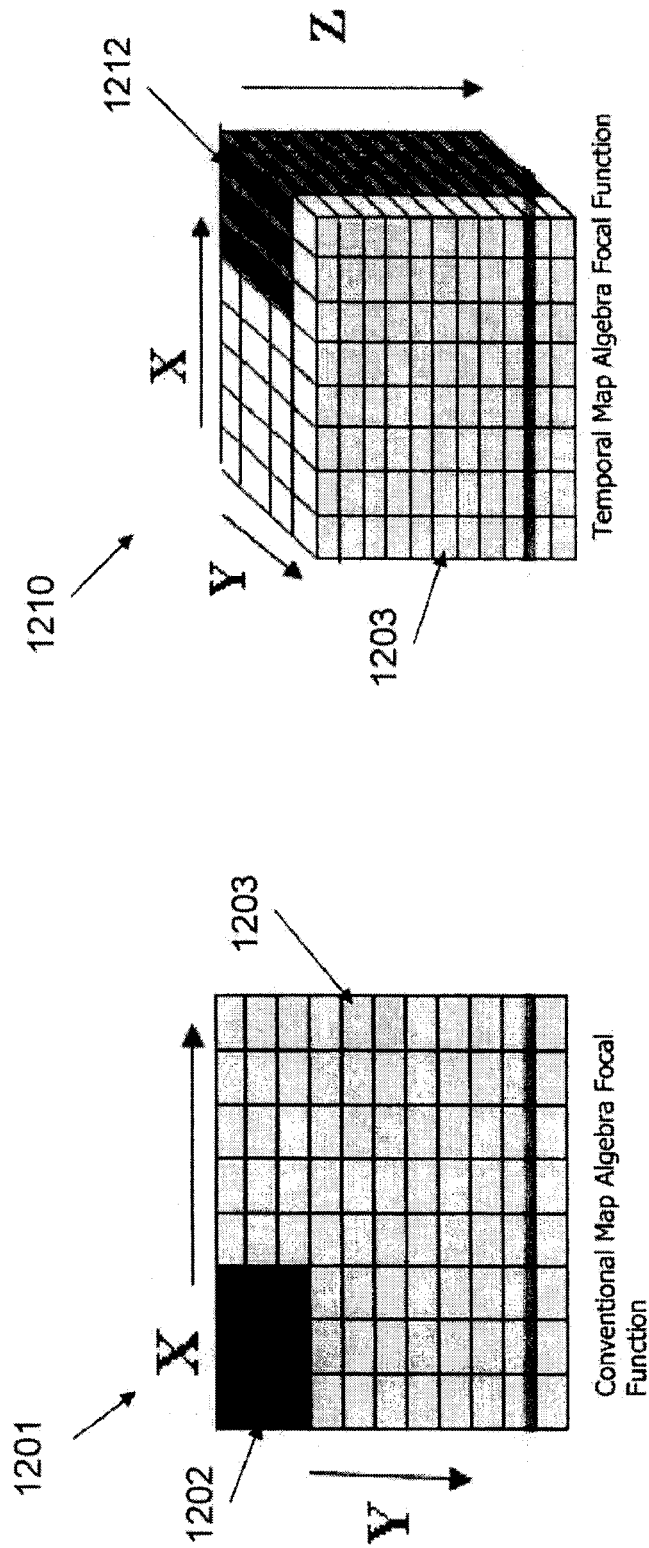
FIG. 12 is a schematic diagram illustrating operation of conventional and temporal map algebra functions.

As in map algebra and other studies, where two-dimensional local, focal and zonal functions are used, temporal map algebra also includes local, focal and zonal functions but in higher dimensions. While the conventional map algebra takes one or more grids as input and outputs a grid, temporal map algebra takes one or more three-dimensional data cubes as input and outputs a three dimensional 'cube' or a two dimensional raster. This concept is illustrated in FIG. 12, which shows a diagram 1201 illustrating how conventional map algebra focal function operates on a two dimensional subset 1202 of two dimensional raster data 1203, and a diagram 1210 illustrating how a temporal map algebra focal function operates on a three dimensional subset 1212 of a three dimensional data cube 1213 (as indicated in FIG. 12, the three dimensional subset moves across all three dimensions of the data cube 1213). Similarly, whereas a conventional map algebra zone function operates on fixed, two dimensional subset of two dimensional raster data, a temporal map algebra function operates on a fixed, three dimensional (x and y dimensions in space and a z dimension in time) subset of a three dimensional temporal data cube.

Temporal map algebra can be used for spatial analysis that are performed by map algebra over a period of time using local, focal and zonal statistics functions like minimum, maximum, mean, median, mode, standard deviation, variance etc. Local functions can give statistics for each point over time, focal functions can give temporal statistical values for a defined region over each pixel, and zonal functions can give statistical data with respect to each defined region.

Figure 2:
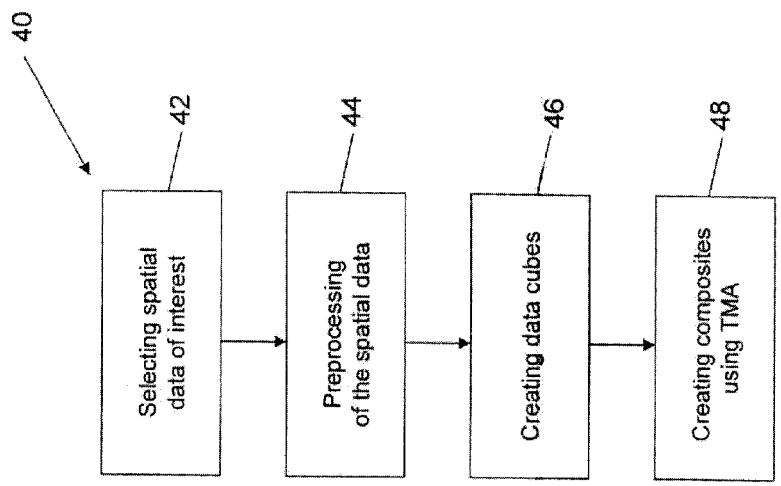
FIG. 2 depicts a flow diagram of a normalized difference vegetation index (NDVI) compositing process, according to an embodiment of the present invention.
Figure 3:
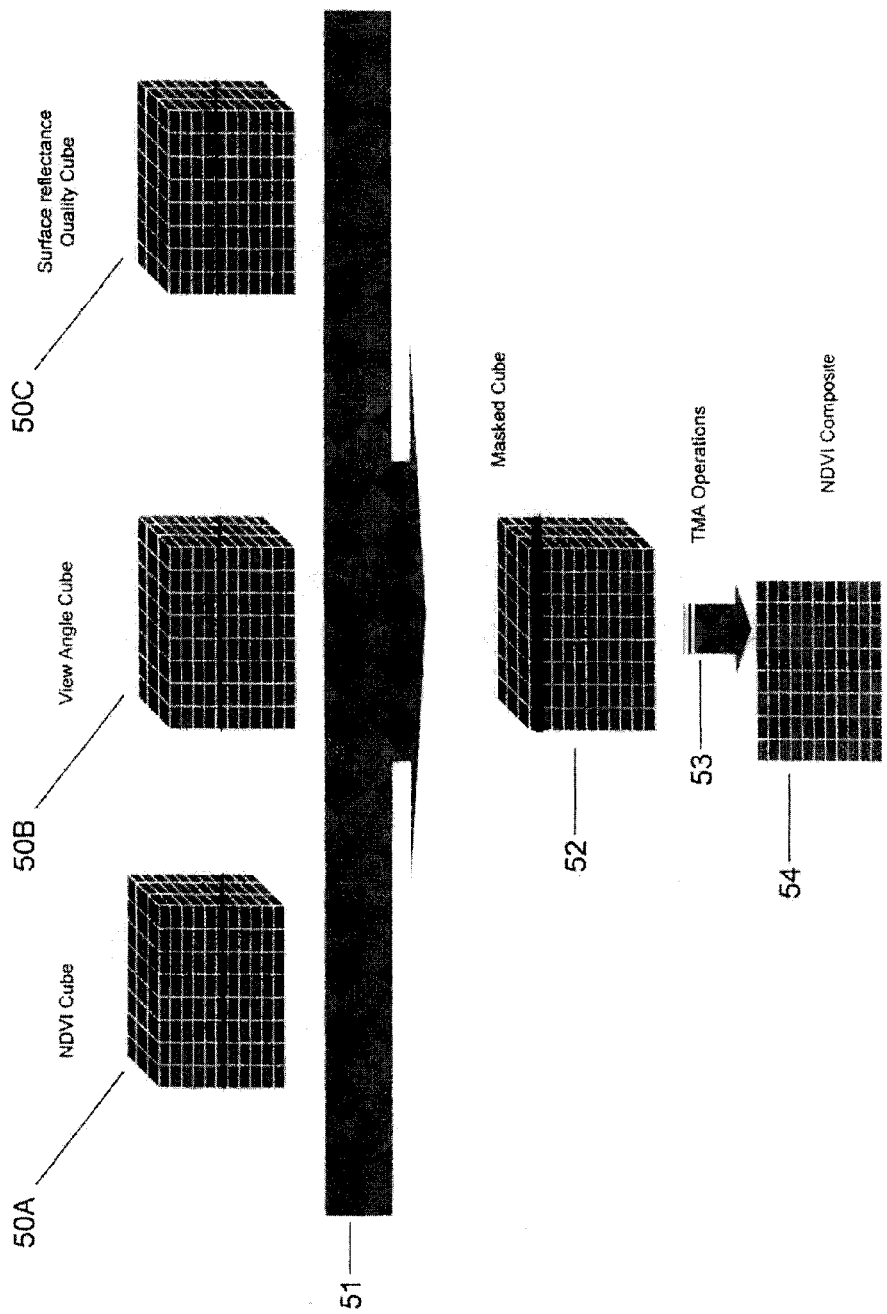
FIG. 3 depicts a schematic representation of a status of data during the compositing process, according to an embodiment of the invention.

FIG. 2 depicts a flow diagram of a normalized difference vegetation index (NDVI) compositing process 40, according to an embodiment of the present invention. In this embodiment, TMA is used for compositing NDVI composites from MODIS and/or AVHRR data products. However, it must be appreciated that other data products may be used instead of or in addition to MODIS and/or AVHRR data products. FIG. 3 depicts a schematic representation of a status of data during the compositing process, according to an embodiment of the invention.

As shown in FIG. 2, the compositing process 40 is initiated by collecting and/or selecting spatial data items of interest, at 42. For example, this may involve the collection of satellite imageries of the spatial area of interest or the selection of specific set of satellite imageries by retrieval of the set of satellite imageries from a repository. The satellite imageries of interest may originate from various sources, including AVHRR, MODIS and SPOT-VGT sensors or other satellite or aerial sensors. The compositing process proceeds by preprocessing of the spatial data, at 44. For example, the preprocessing may include format conversion of the satellite images. The satellite imageries may include atmospheric, geometric and/or radiometric corrections.

The compositing process then progresses by creating data cubes, at 46. In an embodiment of the invention, the AVHRR data comes with satellite sensor angle for each pixel and MODIS data comes with satellite sensor angle and information about each pixel. Therefore, for AVHRR only two cubes can be created, and for MODIS three cubes can be created. For example, as shown in FIG. 3, three cubes 50A, 50B and 50C are created, namely a NDVI cube 50A, a view angle cube 50B and a surface reflectance quality cube 50C. As shown in FIG. 3, a masked cube 52 may be created by combining the three cubes 50A, 50B and 50C as shown by arrow 51. For example, a masked NDVI data cube can be created by excluding all pixels in the NDVI data cube that have a view angle above a certain threshold (i.e., the corresponding pixel in the view angle cube is above the threshold) and/or all pixels that have a surface reflectance above a certain threshold (i.e., the corresponding pixel in the surface reflectance quality cube is below a threshold). Thus, the view angle and surface reflectance quality cubes serve to "mask" the NDVI data cube.

The compositing process continues by creating composites using TMA, at 48. This process of creating composites includes the actual creation of temporal composites using the TMA functions. The TMA functions or operations can be used with or without the satellite view angle or the quality value constraints. For example, as shown in FIG. 3, a NDVI composite 54 is created from the masked cube 52 using TMA operations 53.

In the following paragraphs, a case study example is described to illustrate an application of the process of compositing, according to an embodiment of the present invention.

Figure 4:
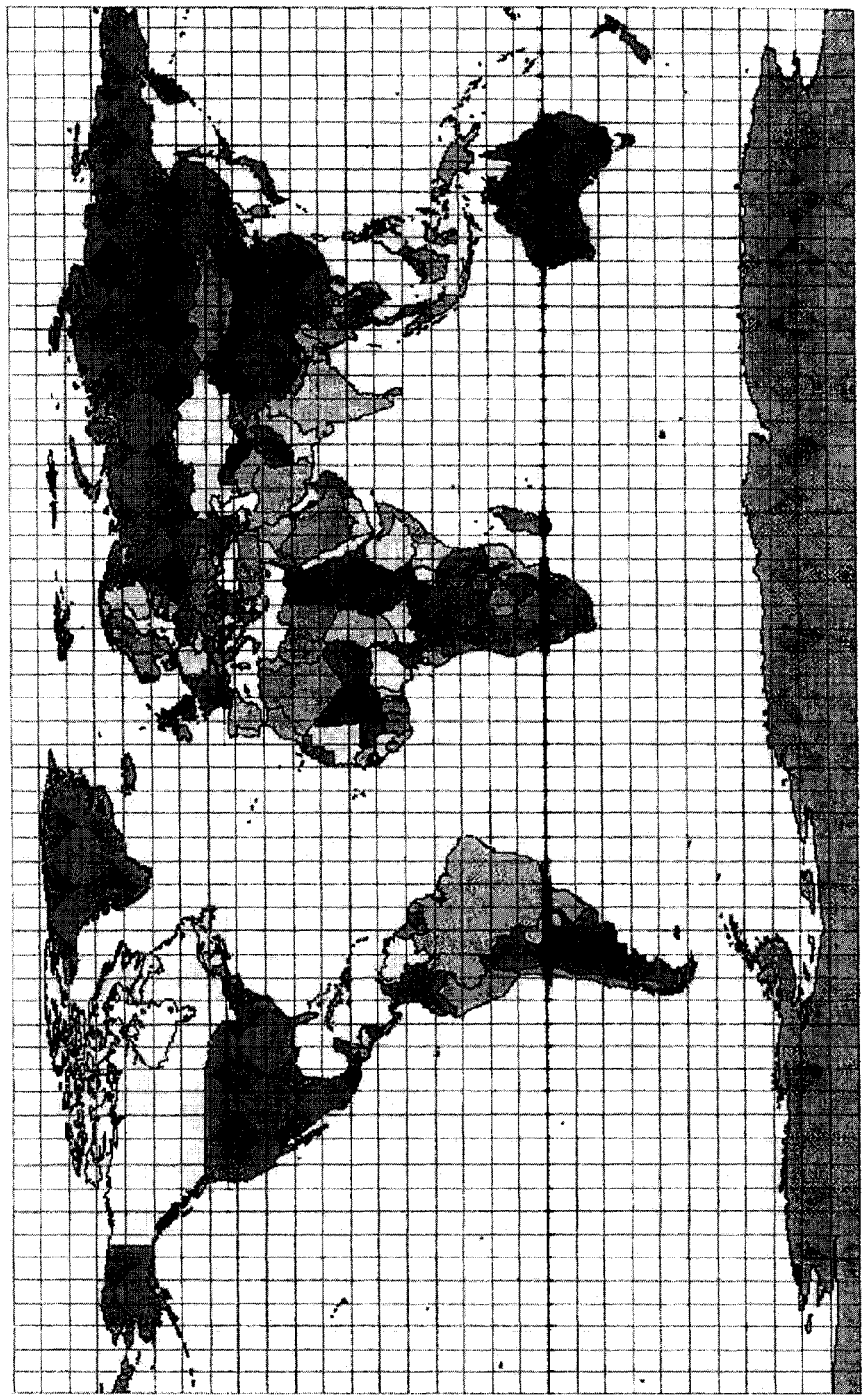
FIG. 4 shows a world map divided into a 6°×6° grid, according to an embodiment of the present invention.

Global NDVI compositing using TMA may require daily NDVI of the world and some additional metadata associated with the sensor. To facilitate the orderly and hierarchical analysis, the world is divided into grids. In one embodiment, the proposed grid size is 6°×6°. FIG. 4 shows a world map divided into a 6°×6° grid, according to an embodiment of the present invention. Therefore, 1800 tiles are generated each day, each tile representing a unique spatial location on earth. From 1800 tiles in a 6°×6° world grid, approximately 950 tiles represent land cover and may be useful for analysis while approximately 850 tiles (not including Antarctica) or approximately 1030 tiles (including Antarctica) correspond to ocean data or ice surface, which may not be useful for analysis.

As stated in the above paragraphs, data products are acquired, preprocessed into the proposed grid structure and then cubes are created. In an embodiment of the invention, MODIS data sets shown in TABLE 3 are used to create the NDVI, Quality and Angle cubes.

TABLE 3

| Name | Size |
|---|---|
| MYD09GQK | 250-300 MB |
| MYD09GST | 10 MB/day |
| MYDMGGAD | 30 MB/day |

Figure 5:
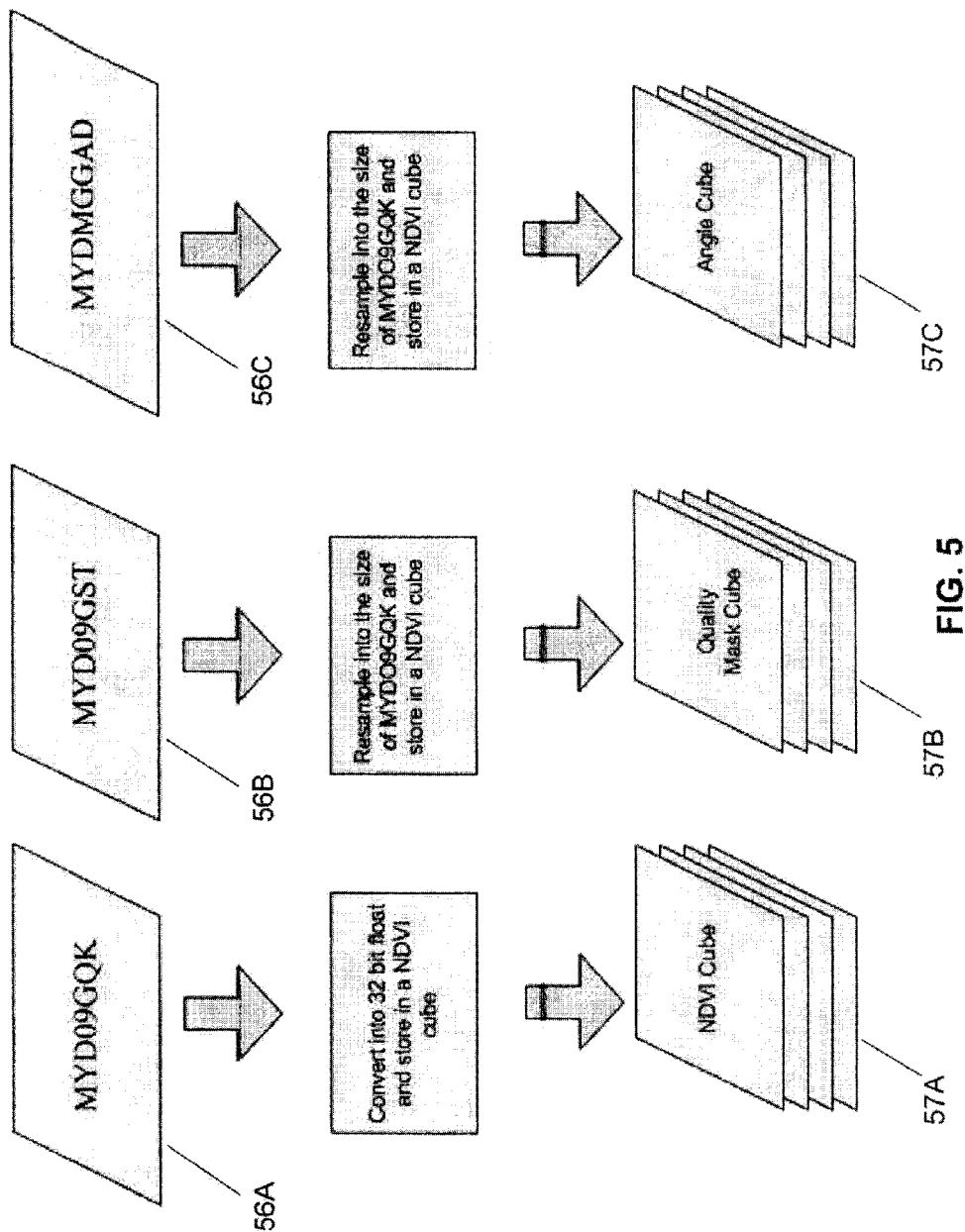
FIG. 5 shows a cube creation procedure, according to an embodiment of the present invention.

FIG. 5 shows a cube creation procedure 55, according to an embodiment of the present invention. The cube creation procedure starts by retrieving files 56A, 56B and 56C which represent reflectance data, angle data and resolution quality data, respectively. Specifically, file 56A is MYD09GQK which is a 250 m resolution surface reflectance data, file 56B is MYDMGGAD which is 1 Km resolution Geo-location angles data and file 56C is MYD09GST which is 1 Km resolution surface reflectance quality data. The file 56A is converted into 32 bit float and stored in a NDVI cube 57A, the file 56B is resampled into the size of file 56A and stored in a NDVI cube 57B and file 56C is also resampled into the size of file 56A and stored in a NDVI cube 57C. After creation of the data cubes 57A, 57B and 57C, the cubes can then be used as an input for compositing and/or analysis using TMA.

Downloaded raw HDF MODIS files can be first re-projected to UTM and then archived and stored. In an embodiment of the invention, the re-projected files can be used for creating cubes. The storage memory required for one 10°×10° tile per day corresponds to approximately 176 MB. For a global grid, assuming all 648 10°×10° tiles of the global grid are stored, 111.38 GB per day (176 MB*648 tiles) may be needed for storage. Therefore, for example, for a 90 day period, the total data would need approximately 10 TB of storage space.

The global images for 90 days require around 4 TB of storage space and the MODIS reprojected data requires 10 TB. Therefore, the storage that may be needed for image cubes and the processed data, is approximately 14 TB for 6°×6° cubes. The numbers in TABLE 4 represent the preprocessed data which may be atmospherically, geometrically and radiometrically corrected and divided into 6°×6° grids, according to an embodiment of the invention. For example, if there is a need for raw MOD 9 data to be stored as a backup, some extra disk space may be needed. Indeed, the MOD 9 file varies in size according to ancillary data. The observed average size of the raw MOD 9 is 350,000 KB, thus for 1000 tiles per 90 days, the required raw data would be an additional 30040 GB.

TABLE 4

| Property | Value |
| --- | --- |
| Dimensions | 2411 × 2856 |
| Number of Cubes | 3 |
| Bits per pixel | 32/16/8 |
| Number of Grids | 1000 |
| Total data per month | 1346.7 GB |
| Total data per 90 Days | 4 TB |

In one embodiment of the invention, a computation time for compositing a 6×6° tiled surface using focal maximum criteria of TMA, developed using MATLAB® and LibTIFF, takes an average of 765.812 seconds (12.76 minutes) when processed in a serial 1.266 GHz Pentium III processor. When considering a global scenario, where 1000 such composites may be needed, the total serial time is 12760 minutes, i.e. 8.86 days. Thus, in order to increase the computing speedup and reduce the overall processing time, parallel computing may be used.

In one embodiment, a parallel application is developed using MatlabMPI, MATLAB® and LibTIFF for the creation of composites. An experiment is conducted to compute NDVI composites using different number of processors on EMPIRE cluster at ERC. The input data-sets that are used is a sample 6°×6° NDVI, mask and angle cubes generated from MODIS data products. In one embodiment, the input data sets are stored at a central network file server and each processor is able to read an equal chunk of the data grids during the computation.

Figure 6:
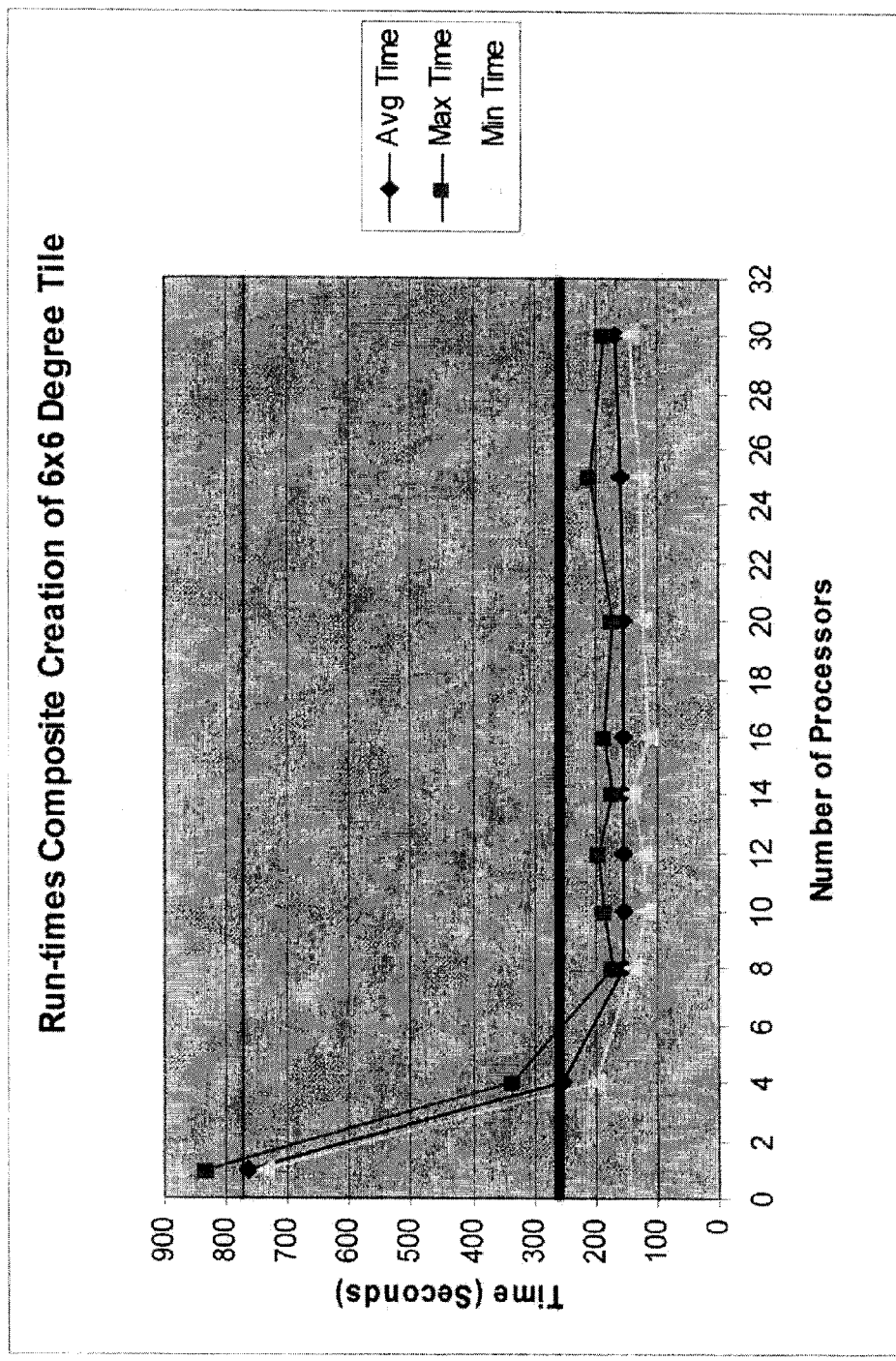
FIG. 6 is a plot of processing time versus number of processors used, according to an embodiment of the present invention.

Results of the experiment and the evaluation metrics that illustrate the run time statistics for the computation of the composite are shown in TABLE 5 and FIG. 6. FIG. 6 is a plot of processing time (runtime) versus number of processors used, according to an embodiment of the present invention. Experiments are conducted several times so as to obtain an average value to offset differences in readings caused by network traffic during the experiments. As shown in TABLE 5, a maximum speedup of 5.05 is achieved with 8 processors with a relatively good efficiency of 0.63.

TABLE 5

| Number of Processors | Average Time | Maximum Time | Minimum Time | Speedup | Efficiency |
| --- | --- | --- | --- | --- | --- |
| 1 | 765.811983 | 834.153324 | 739.023802 | 1 | 1 |
| 4 | 251.951745 | 333.848594 | 199.157513 | 3.0395185 | 0.759879619 |
| 8 | 151.544333 | 171.047145 | 139.355625 | 5.0533858 | 0.631673229 |
| 10 | 153.309654 | 185.503882 | 117.218752 | 4.9951974 | 0.499519738 |
| 12 | 152.63978 | 196.572159 | 124.174527 | 5.0171193 | 0.418093274 |
| 14 | 152.605444 | 174.015528 | 138.758342 | 5.0182481 | 0.358446294 |
| 16 | 152.976114 | 185.192775 | 114.307623 | 5.0060886 | 0.312880538 |
| 20 | 152.063058 | 173.517693 | 120.620541 | 5.0361474 | 0.251807372 |
| 25 | 159.84638 | 209.205111 | 127.161483 | 4.7909248 | 0.156400164 |
| 30 | 168.089439 | 186.534178 | 146.769031 | 4.5559792 | 0.151865973 |

From TABLE 5 and FIG. 6, it can be seen that speedup increases as the number of processors is increased from 1 to 8. However, the speedup remains relatively constant when the number of processors is increased beyond 8.

Figure 7:
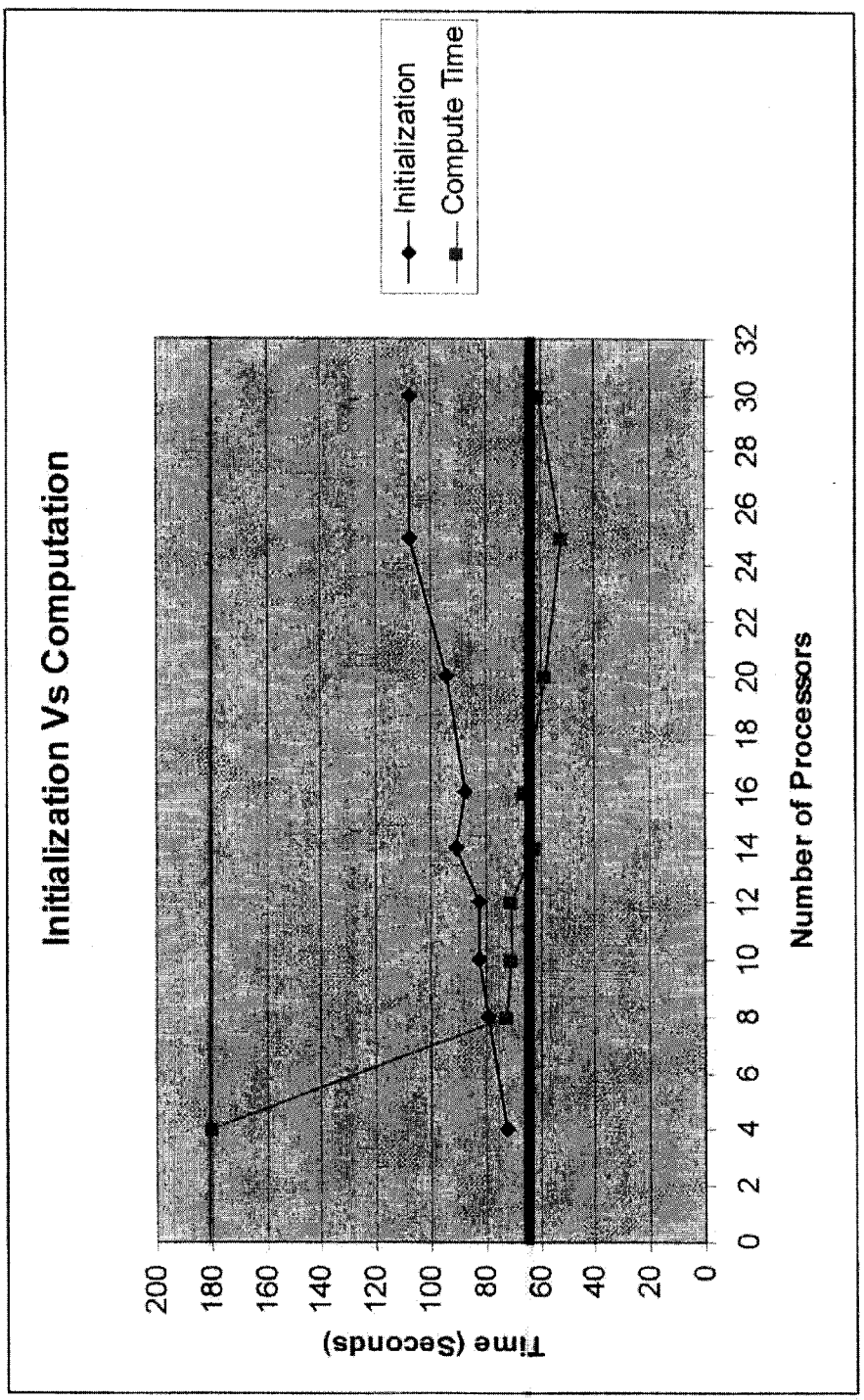
FIG. 7 is a plot of initializing time and computation time versus the number of processors, according to an embodiment of the present invention.

To analyze this trend, initializing times and computation times are plotted against the number of processors in the same graph. FIG. 7 is a plot of initializing times and computation time versus the number of processors, according to an embodiment of the present invention. It can be seen from this plot that the initialization time, which is the sum of MATLAB starting and data copying at each processor, is increasing as the number of processors increases. It can also be noted that the actual computation-times of the composites are decreasing. As data transfer from a central repository to each processor decreases with the increase of the number of processors, it can be inferred that the initialization of MATLAB in each processor represents the overhead time.

Figure 8:
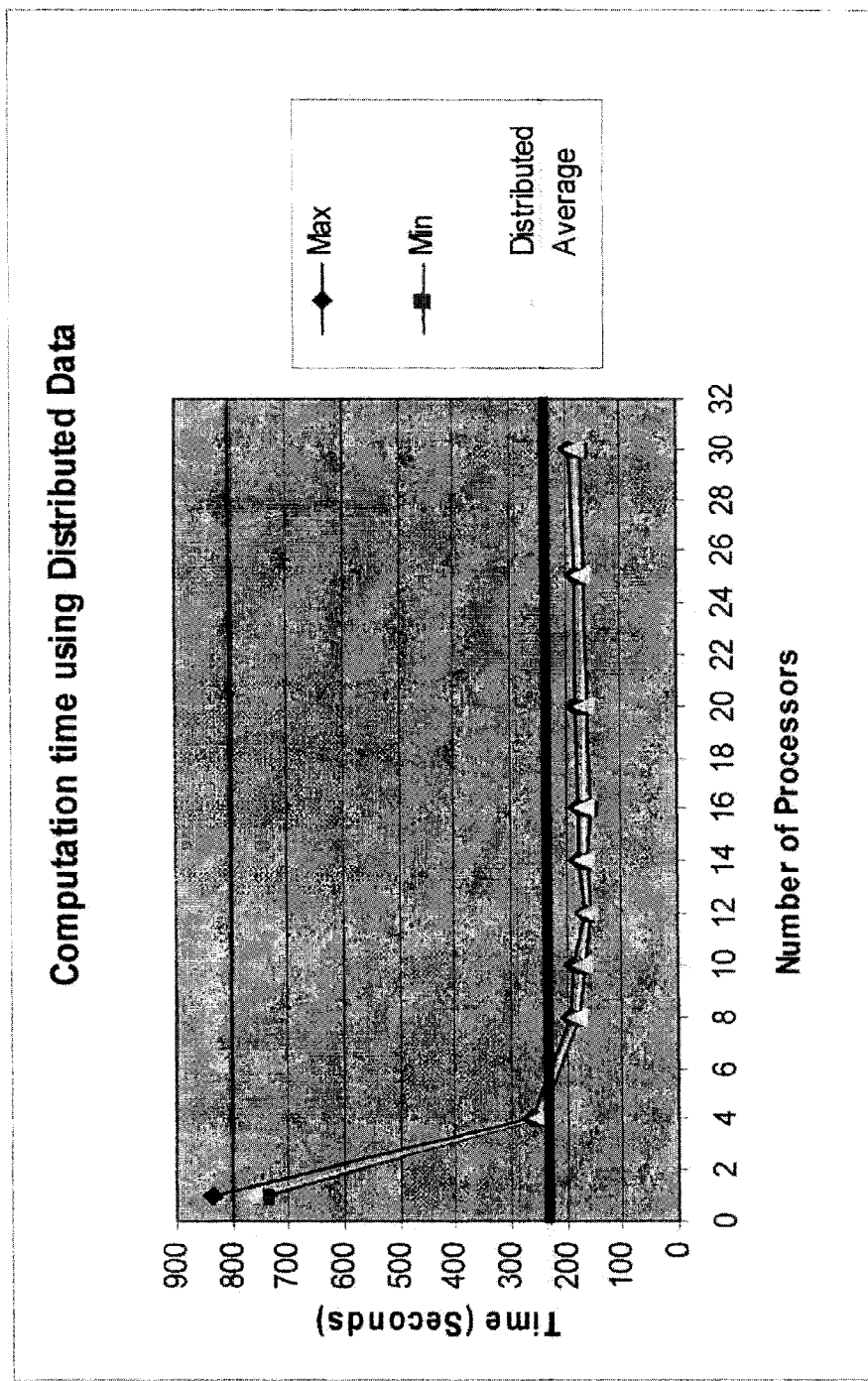
FIG. 8 is plot of a runtime versus number of processors for composite creation using distributed parallel I/O, according to an embodiment of the present invention.

Furthermore, network load during the execution of the application may also play a certain role in adversely affecting the run times when the network is busy. Therefore, parallel I/O may be able to enhance the overall computing speedup so that the system would not be too dependent on the network load. To that effect, in one embodiment of the invention, experiments are conducted to simulate parallel I/O with a number of processors. Each individual node of the EMPIRE cluster has a local disk drive, which is used for the distributed I/O. Results of the experiments are illustrated in TABLE 6 and FIG. 8. FIG. 8 is plot of a run-time versus number of processors for composite creation using distributed parallel I/O, according to an embodiment of the present invention.

TABLE 6

| Number of Processors | Maximum Time | Minimum Time | Average Time | Speedup | Efficiency |
|---|---|---|---|---|---|
| 1 | 834.153324 | 739.023802 | 765.811983 | 1 | 1 |
| 4 | 262.962067 | 246.975358 | 253.168483 | 3.02491 | 0.756228 |
| 8 | 192.468319 | 175.478343 | 182.576255 | 4.194477 | 0.52431 |
| 10 | 188.161869 | 165.297106 | 170.657879 | 4.487411 | 0.448741 |
| 12 | 166.718699 | 157.692338 | 160.755206 | 4.763839 | 0.396987 |
| 14 | 177.299994 | 159.569891 | 163.83409 | 4.674314 | 0.33388 |
| 16 | 175.804169 | 156.449645 | 165.037114 | 4.640241 | 0.290015 |
| 20 | 179.575204 | 159.396371 | 164.370743 | 4.659053 | 0.232953 |
| 25 | 180.283899 | 164.247723 | 171.055327 | 4.476984 | 0.179079 |
| 30 | 191.430897 | 170.417365 | 181.648073 | 4.21591 | 0.14053 |

From the FIGS. 6 and 8, it can be observed that the centralized and simulated distributed applications show the same property. If the time taken by the individual processes to copy the remotely located input data-sets is removed or reduced, better performance can be achieved with lesser network traffic load using distributed/parallel I/O.

Figure 9:
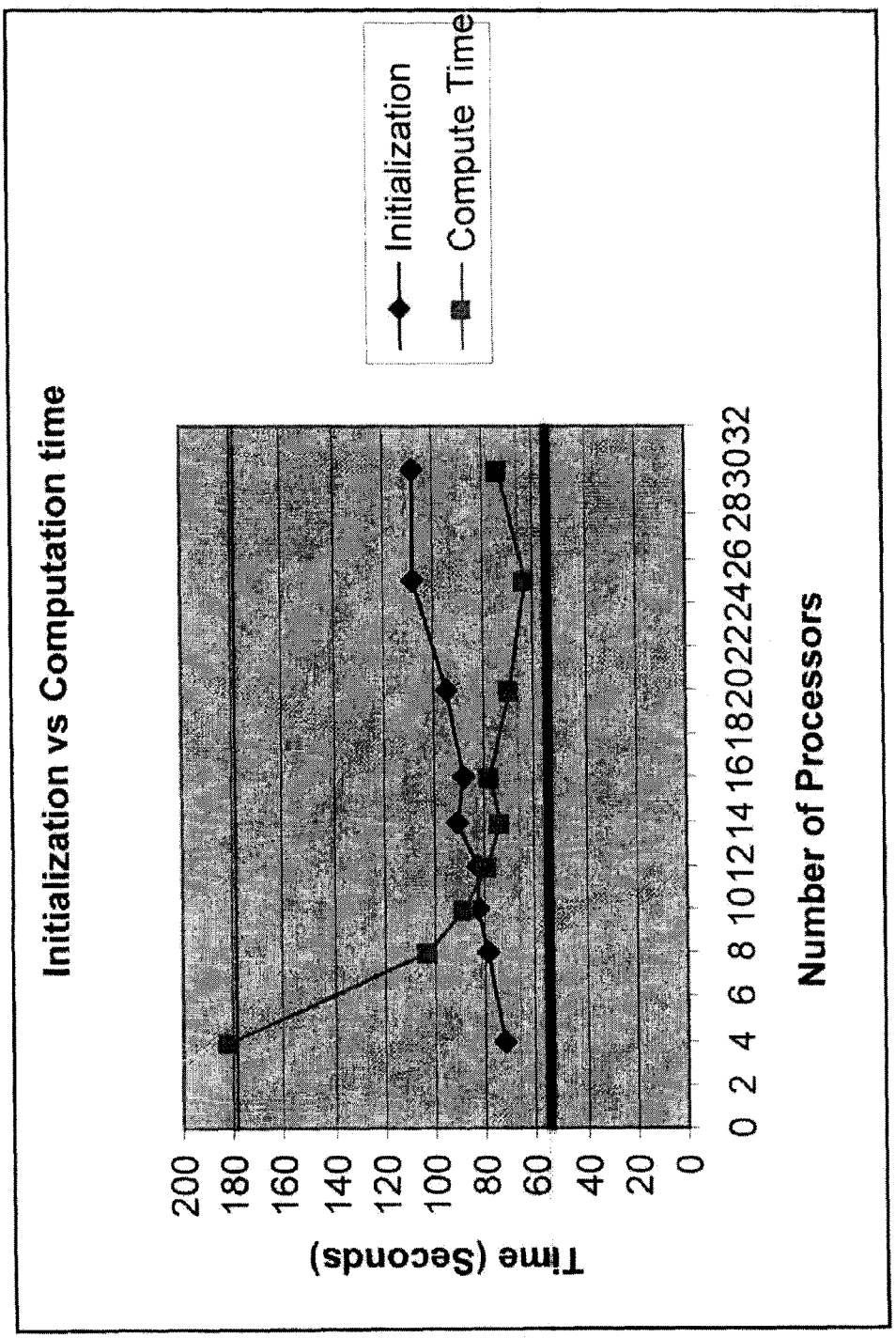
FIG. 9 is a plot of computation time and initialization time versus number of processors in a distributed parallel I/O environment, according to an embodiment of the present invention.

FIG. 9 is a plot of computation time and initialization time versus number of processors in a distributed parallel I/O environment, according to an embodiment of the present invention. The initializing time represents the time taken for the data to be copied from the remote location to individual node's local disk space. The computation time is the time it takes for the CPU to read in the local data-sets and process the composite using Focal Maximum criteria. It can be seen from this plot that the initializing times and the actual computing times for distributed processing displays the same behavior as in the plot shown in FIG. 7. Hence, in this example, 8 to 12 processors may be sufficient to achieve the expected efficiency in a computation of 14 day NDVI composites for 6°×6° tiles as described in the above paragraphs. However, an increase in the temporal range of data would translate into a higher input data size which would lead to an increase in both local I/O, communication between processors and computation which ultimately may lead to an increase in computation time.

In the following paragraphs, a study of biosphere productive capacity for agricultural yield estimation for food security decision support was performed using the temporal mapping and analysis tool described above. Indeed, methods for improving computational creation of products needed for crop productivity and yield estimations are of interest to the agricultural community.

For example, the United States Department of Agriculture (USDA) and the National Aeronautics and Space Administration (NASA) utilize a 14-day AVHRR composite for vegetation condition monitoring program and desire a similar MODIS product. With the use of TMA, according to an embodiment of the present invention, methods are developed to leverage standard MODIS daily reflectance products into composites that closely match AVHRR composites. Furthermore, the TMA based methods also provide additional information and resolution that meet and/or exceed USDA's decision support needs.

Figure 10:
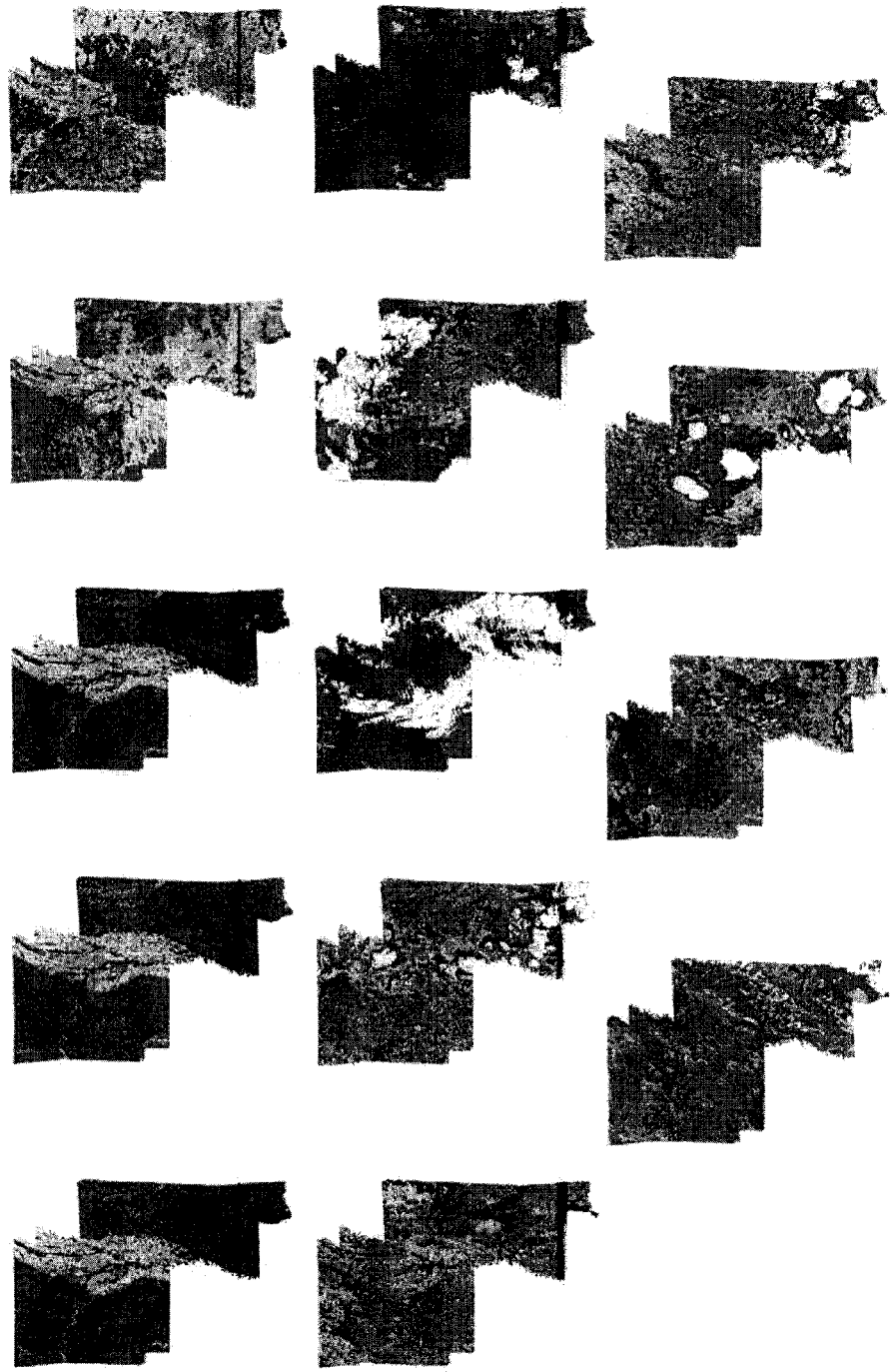
FIG. 10 depicts a series of MODIS NDVI images for Mississippi and Arkansas from daily reflectance data for the period May 5, 2004 to May 18, 2004.

FIG. 10 depicts a series of MODIS NDVI images for Mississippi and Arkansas from daily reflectance data for the period May 5, 2004 to May 18, 2004. Shades of green indicate vegetation vigor while gray, red, and white areas indicate water and clouds.

Figure 11A:
FIGS. 11A and 11B show custom TMA-generated MODIS and AVHRR 14-day composites created from images for Mississippi and Arkansas from daily reflectance data for the period May 5, 2004 to May 18, 2004.
Figure 11B:

FIGS. 11A and 11B show custom TMA-generated MODIS and AVHRR 14-day composites created from images for Mississippi and Arkansas from daily reflectance data for the period May 5, 2004 to May 18, 2004.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above-described exemplary embodiments. For example, the temporal mapping system and method described above can not only be used on imagery data but also on meteorologic data or any other high-temporal resolution data that may be included in a temporal hypercube to facilitate time series or spatial analysis or other many forms of manipulation and processing.

Moreover, the methods and systems of the present invention, like related systems and methods used in the imaging arts are complex in nature, are often best practiced by empirically determining the appropriate values of the operating parameters, or by conducting computer simulations to arrive at best design for a given application. Accordingly, all suitable modifications, combinations and equivalents should be considered as falling within the spirit and scope of the invention.

In addition, it should be understood that the figures, are presented for example purposes only. The architecture of the present invention is sufficiently flexible and configurable, such that it may be utilized in ways other than that shown in the accompanying figures.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope of the present invention in any way.

What is claimed is:

1. A method of mapping and analyzing co-registered raster data from images of the surface of the earth collected for at least one location of the earth over different periods of time, the method comprising:

creating using a computer-based device a first temporal data cube using co-registered raster data collected over a period of time, wherein the first temporal data cube is composed of geographically co-registered temporal raster data sets as ordered stacks of bands within a multi-band image; and performing using a computer-based device at least one temporal mapping algebra function on the first temporal data cube to create a composite raster data product and to extend conventional map algebra functions to temporal map algebra functions for analyzing the temporal dimension of the data cube, wherein the computational methods implemented optionally utilize distributed input/output and optionally utilize parallel processing to distribute the data, decompose the problem, and speedup efficiency to the solution.

2. The method of claim 1, further comprising:
creating a second temporal data cube; and
masking the first temporal data cube using the second temporal data cube prior to performing the at least one temporal mapping algebra function.

3. The method of claim 1, wherein the raster data comprises image data.

4. The method of claim 1, wherein the raster data is raw sensor data.

5. The method of claim 1, wherein the raster data is selected from the group consisting of moderate resolution imaging spectro-radiometer (MODIS) data, advanced very high resolution radiometer (AVHRR) data, spot vegetation sensor (SPOT-VGT) data, and any combination of two or more thereof.

6. The method of claim 1, further comprising calculating the raster data from raw sensor data.

7. The method of claim 1, wherein the raster data comprises normalized difference vegetation index (NDVI), enhanced vegetation index (EVI), scan angle, or quality information, or any combination of two or more thereof to obtain a set of data.

8. The method of claim 1, wherein the temporal mapping algebra function is selected from the group consisting of a local temporal map algebra function, a focal temporal map algebra function, a zonal temporal map algebra function, and a global temporal map algebra function.

9. The method of claim 8, wherein the local temporal map algebra function comprises computing a value for a specified pixel over a specified time period.

10. The method of claim 9, wherein the local temporal map algebra function is applied to obtain statistics for each data point in the first temporal data cube over time.

11. The method of claim 8, wherein the zonal map algebra function comprises calculating a value for each of a plurality of pixels, wherein the value for a pixel is based on a plurality of pixels in a specified fixed spatial and temporal subset of the first temporal data cube.

12. A system for mapping and analyzing co-registered raster data from images of the surface of the earth collected for at least one location of the earth over different periods of time, the system comprising:
a memory; and
a processor, wherein the processor is configured to perform the steps of:
creating using a computer-based device a first temporal data cube using co-registered raster data collected over a period of time, wherein the first temporal data cube is composed of geographically co-registered temporal raster data sets as ordered stacks of bands within a multi-band image;
storing the first temporal data cube in the memory; and
performing using a computer-based device at least one temporal mapping algebra function on the first temporal data cube to create a composite raster data product and to extend conventional map algebra functions to temporal map algebra functions for analyzing the temporal dimension of the data cube, wherein the computational methods implemented optionally utilize distributed input/output and optionally utilize parallel processing to distribute the data, decompose the problem, and speedup efficiency to the solution.

13. The system of claim 12, wherein the processor is further configured to perform the steps of:
creating a second temporal data cube; and
masking the first temporal data cube using the second temporal data cube prior to performing the at least one temporal mapping algebra function.

14. The system of claim 12, wherein the processor is configured to perform local temporal map algebra functions, focal temporal map algebra functions, zonal temporal map algebra functions, and global temporal map algebra functions.

15. A compositing process for selecting and analyzing spatial data from images of the surface of the earth collected for at least one location of the earth over different periods of time using a computer-based device, the process comprising:
accessing spatial data;
preprocessing the spatial data;
creating data cubes from the preprocessed spatial data, wherein the data cubes are composed of geographically co-registered temporal raster data sets as ordered stacks of bands within a multi-band image;
creating a masked cube using the data cubes; and
computing a composite from the masked cube using temporal mapping algebra to extend conventional map algebra functions to temporal map algebra functions for analyzing the temporal dimension of the data cubes, wherein the computational methods implemented optionally utilize distributed input/output and optionally utilize parallel processing to distribute the data, decompose the problem, and speedup efficiency to the solution.

16. The compositing process of claim 15, wherein the spatial data comprises meterologic data.

17. The compositing process of claim 15, wherein the spatial data comprises satellite imagery data.

18. The compositing process of claim 17, wherein the satellite imagery data originates from advanced very high resolution radiometer (AVHRR), moderate resolution imaging spectro-radiometer (MODIS), or spot vegetation (SPOT-VGT) sensor, or any combination of two or more thereof.

19. The compositing process of claim 17, wherein the satellite imagery data comprises atmospheric, geometric or radiometric correction, or any combination of two or more thereof.

20. The compositing process of claim 15, wherein the creating of the data cubes comprises creating a normalized difference vegetation index (NDVI) cube, a view angle cube, and a surface reflectance quality cube.

21. The compositing process of claim 20, wherein the creating of the view angle cube comprises retrieving a file comprising angle data, resampling the file into a size of the file comprising the reflectance data, and storing the resampled file in the view angle cube.

22. The compositing process of claim 20, wherein the creating of the surface reflectance quality cube comprises retrieving a file comprising surface reflection quality data, resampling the file into a size of the file comprising the reflectance data, and storing the resampled file in the surface reflectance quality cube.

23. A system for forming a composite of spatial data from images of the surface of the earth collected for at least one location of the earth over different periods of time using a computer-based device, the system comprising:
a memory; and
a processor connected to the memory, wherein the processor is configured to perform the steps of:

accessing spatial data;
preprocessing the spatial data;
creating data cubes from the preprocessed spatial data, wherein the data cubes are composed of geographically co-registered temporal raster data sets as ordered stacks of bands within a multi-band image;
storing the data cubes in the memory;
creating a masked cube using the data cubes; and
computing a composite from the masked cube using temporal mapping algebra to extend conventional map algebra functions to temporal map algebra functions for analyzing the temporal dimension of the data cubes, wherein the computational methods implemented optionally utilize distributed input/output and optionally utilize parallel processing to distribute the data, decompose the problem, and speedup efficiency to the solution.

* * * * *